US008885813B2

(12) United States Patent
Vendrow et al.

(10) Patent No.: US 8,885,813 B2
(45) Date of Patent: Nov. 11, 2014

(54) CALL QUEUING FOR LOCATION-AWARE MOBILE DEVICES

(75) Inventors: Vlad Vendrow, Redwood Shores, CA (US); Bruce Young, San Jose, CA (US); Praful Shah, Los Altos Hills, CA (US); Boris Elpiner, Sunnyvale, CA (US); Vladimir Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 1029 days.

(21) Appl. No.: 12/620,641

(22) Filed: Nov. 18, 2009

(65) Prior Publication Data

US 2010/0128867 A1 May 27, 2010

Related U.S. Application Data

(60) Provisional application No. 61/117,555, filed on Nov. 24, 2008.

(51) Int. Cl.
*H04M 3/00* (2006.01)
*H04W 24/00* (2009.01)
*H04M 3/523* (2006.01)
*H04M 3/42* (2006.01)

(52) U.S. Cl.
CPC .......... *H04M 3/523* (2013.01); *H04M 3/42246* (2013.01); *H04M 3/4234* (2013.01); *H04M 2207/18* (2013.01)
USPC .................................. 379/266.01; 455/456.1

(58) Field of Classification Search
USPC ......... 379/265.02, 266.01, 265.11; 455/456.1
See application file for complete search history.

(56) References Cited

U.S. PATENT DOCUMENTS

| 6,801,520 | B2 | 10/2004 | Philonenko |
| 6,804,343 | B2 * | 10/2004 | Hafez ....................... 379/211.01 |
| 7,110,523 | B2 | 9/2006 | Gagle |
| 7,941,130 | B2 * | 5/2011 | Moton et al. .................. 455/417 |
| 2004/0081309 | A1 * | 4/2004 | Bickford et al. ......... 379/265.02 |
| 2005/0047579 | A1 * | 3/2005 | Salame ..................... 379/265.09 |
| 2006/0126816 | A1 * | 6/2006 | Shaffer et al. ............ 379/265.02 |
| 2006/0252444 | A1 * | 11/2006 | Ozugur ........................ 455/519 |
| 2008/0037763 | A1 | 2/2008 | Shaffer et al. |

FOREIGN PATENT DOCUMENTS

EP      1185064 A2 *  3/2002

OTHER PUBLICATIONS

Authorized officer Commissioner, International Search Report/Written Opinion in PCT/US2009/065038 mailed Jun. 25, 2010, 15 pages.
International Preliminary Report on Patentability for PCT Application No. PCT/US2009/065038, dated Jun. 3, 2011, 6 pages.

* cited by examiner

*Primary Examiner* — Sonia Gay
(74) *Attorney, Agent, or Firm* — Fish & Richardson P.C.

(57) ABSTRACT

A mobile device can be assigned to an extension configured as a Queue Agent ("QA") in a call-queuing enabled virtual private branch exchange (vPBX). This and other mobile or fixed devices can be interconnected to form a virtual call center. Each extension can be assigned various rules, which specify how the incoming calls are answered at the extension and how calls in the call queue are selected for answering by the QA. As part of the rules, the vPBX system forwards calls from a call queue to the QA based on QA's availability status. If a location-aware mobile device is associated with the QA, the vPBX system can determine the QA's availability status based on a geographic location of the mobile device. A most geographically proximate agent can be selected for answering the call.

22 Claims, 12 Drawing Sheets

800

Agent List

| Extension (810) | Device (820) | Available Time (830) |
|---|---|---|
| 1000 | 650 555 1234 | 9am – 5pm |
| 1000 | Mobile Device 1 | 5pm – 10pm |
| 1000 | Voice Mail | 10pm – 9am |
| 1001 | Mobile Device 2 | 9am - 9am |

Mobile Availability List

| Device (860) | Status (870) | Action (880) |
|---|---|---|
| Mobile Device 2 | Home | 650 555 4321 |
| Mobile Device 2 | Office | 650 555 1234 |
| Mobile Device 2 | Non-Specified | Connect |

FIG. 8B

CALL QUEUING FOR LOCATION-AWARE MOBILE DEVICES

CROSS-REFERENCE TO RELATED APPLICATIONS

This application claims priority to pending U.S. Provisional Application Ser. No. 61/117,555, titled "CALL QUEUING FOR LOCATION-AWARE MOBILE DEVICES", filed Nov. 24, 2008, the disclosure of which is incorporated herein by reference in its entirety.

TECHNICAL FIELD

This subject matter relates to managing calls for mobile devices.

BACKGROUND

A private branch exchange (PBX) is a telephone network that serves a business or an office. A virtual PBX (vPBX) allows a business or office to be served by a PBX system hosted on remote servers. The service can be provided through a combined voice network (e.g. telephone network) and data network (e.g. Internet). Call queuing is a feature that can support a large number of callers, allowing each to wait for an available queue agent to become accessible to assist them.

SUMMARY

In a vPBX system that supports call queuing, a mobile device can be assigned to an extension configured as a queue agent. The mobile device and other mobile or fixed devices can be interconnected to form a virtual call center in the vPBX system. Each extension can be assigned various rules that can specify how the incoming calls are answered at the extension and how the calls in the queue are selected for answering by a queue agent.

As part of the rules, the system can forward the calls from a call queue to a queue agent based on queue agent's availability status. If a location-aware mobile device (such as a mobile phone that incorporates, or is coupled with, a positioning system such as a Global Positioning System (GPS) system) is associated with the queue agent's extension, the vPBX system can apply location based queue processing rules in assigning the queue agent. For example, a vPBX server can select a mobile device that is most geographically proximate to a caller to answer the caller's call in the queue. In addition, the vPBX system can further apply location based forwarding rules to forward a call to a device designated by the queue agent, based on the queue agent's location.

The details of one or more implementations of call management of location-aware mobile devices are set forth in the accompanying drawings and the description below. Other features, objects, and advantages of the techniques will be apparent from the description and drawings, and from the claims.

DESCRIPTION OF DRAWINGS

FIGS. 8A-8B show examples of agent profile answering rules and mobile device availability rules.

Like reference symbols in the various drawings indicate like elements.

DETAILED DESCRIPTION

A vPBX system can be configured to enable call queuing. Call queuing allows a relatively small group of people, for example customer service agents, to handle a relatively large number of customer calls. Calls made into a call-queuing enabled vPBX system are put into a queue. The vPBX system connects queue agents to a head of the queue in turn. A queue agent is an extension that is configured to receive calls in a queue. In some implementations, a queue agent can be a mobile device. In some implementations, multiple devices can be associated with a single extension. The availability of queue agents can be determined by, for example, specifying that a person has a particular skill level, belongs to a particular call center, works at a particular time of day, etc. The availability of a queue agent can further be determined by a location of a mobile device associated with the queue agent. The vPBX system can infer the location of a mobile device by receiving geographic coordinates of mobile device. Location based availability rules can allow the vPBX system to dynamically determine whether a mobile device can answer a call based on, for example, whether the mobile device is in office, at home, or in a conference room.

Call Management System Overview

Figure 1:
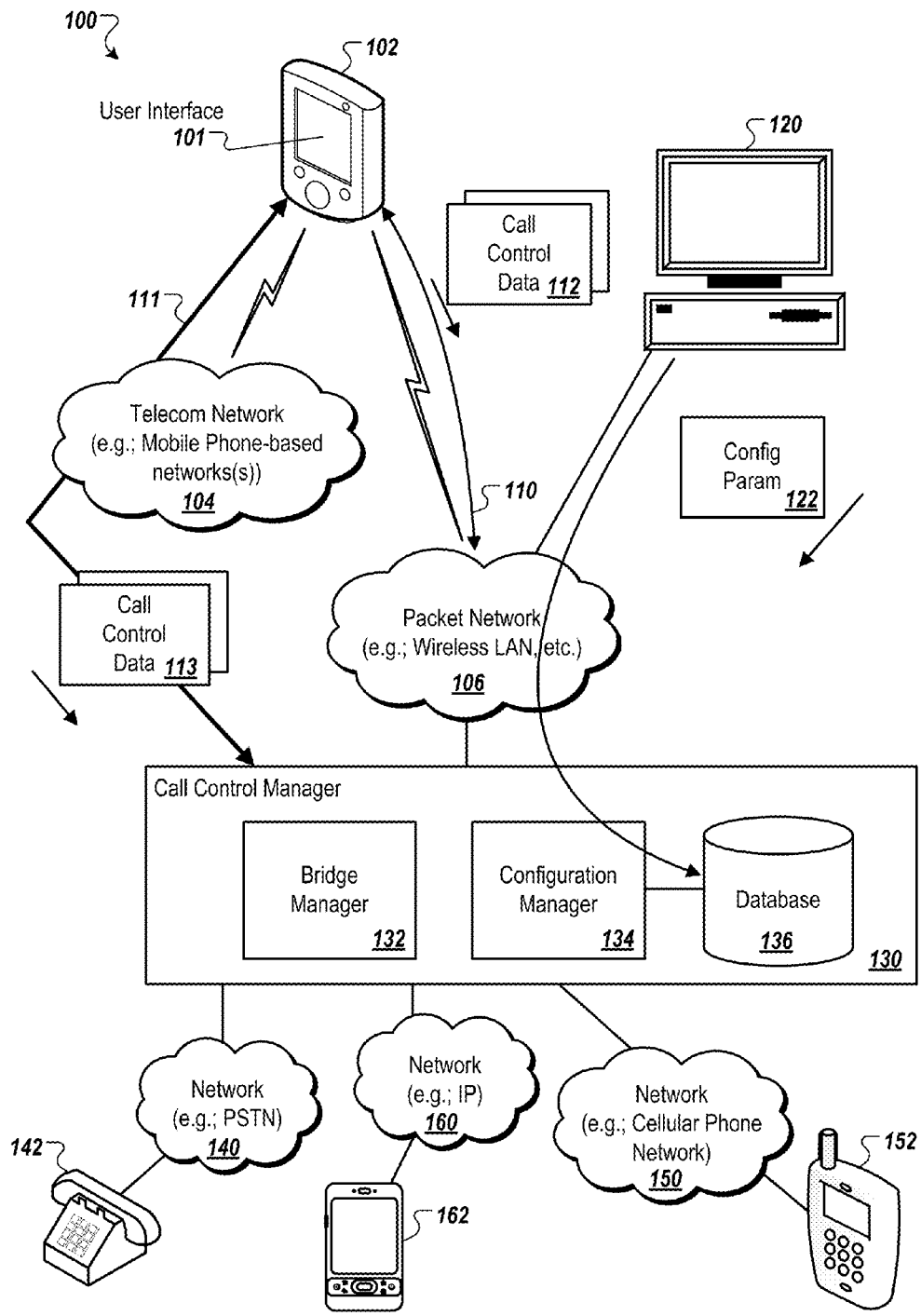
FIG. 1 is a block diagram of an example call management system, including a mobile device configured to interact with a call control manager.

FIG. 1 is a block diagram of a call management system 100, including a mobile device 102 configured to interact with a call control manager 130. In this example, the mobile device 102 can be configured to communicate using multiple modes of communication (i.e., "multi-modal channels of communication"). Network 104 operates in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and the like. Network 106 operates in accordance with a second mode of communication. Examples of the second mode of communication include VOIP phone technologies, wireless LAN technologies (e.g., telephone technologies/standards, such as WiMAX and any other IEEE 802.xx-based technologies/standards), and the like. Any number of modes is possible.

Further to FIG. 1, Mobile Device 102 can be configured to interact with a call control manager 130, over a call control communications channel, which in some implementations can be a broadband call control channel 110. In some implementations, broadband call control channel 110 can be established in network 106 (e.g., in the same or separate channel used to convey voice/video data, such as in a Session Initiation Protocol ("SIP") message). In some implementations, another narrowband call control channel 111 can be established in network 104 (e.g., a mobile operator can provide in the same or separate channel used to convey voice/video data, such as in an Short Message Service ("SMS") message). Mobile Device 102 and/or call control manager 130 can be configured to establish narrowband 111 and/or broadband 110 call control channels so Mobile Device 102 and/or call control manager 130 can transmit and/or receive call control data 113 (over the narrowband call control channel 111) and/or 112 (over the broadband channel 110). Call control manager 130 can be configured to effect a number of call controlling functions that can be performed remotely from Mobile Device 102. Thus, call control manager 130 can perform call control operations in association with a first call from a phone 142 via network 140 and/or a second call from a phone 152 via network 150 and/or a second call from a phone 162 via a network 160. In one implementation, call control manager 130 can be disposed in a central office ("CO"). In another implementation, Mobile Device 102 includes an interface, such as a user interface 101, for facilitating generation, receipt, and processing, and management of call control data 112 and 113 for delivery over narrowband 111 and/or broadband 110 call control channels. Interface 101 can be configured to implement various functionalities, including receiving inbound calls, dialing outbound calls, and click to call generating a combined inbound and outbound call.

In at least some implementations, call control manager 130 includes a bridge manager 132, a configuration manager 134, and a repository ("DB") 136. Bridge manager 132 can be configured to perform inbound call delivery, call routing, call transfer functions, conference call functions, and the like, for Mobile Device 102. Call control manager 130 can provide for bridging calls generated by disparate telecommunications technologies associated with communications devices 142 and 152 and 162. For example, as an alternative to answering an inbound call on Mobile Device 102, the call can be recorded (such as voice mail) on Mobile Device 102 and/or on the call control manager 130 and simultaneously reviewed on Mobile Device 102 via user interface 101. During call recording, the inbound call can be answered dynamically at Mobile Device 102 and/or transferred to one or more of communications devices 142, 152, and 162. Completed recordings (e.g., announcements, voice mail, etc.) can be reviewed at Mobile Device 102 via user interface 101.

Configuration manager 134 can be configured to interact with a remote computing device 120 or with a Mobile Device 102 to receive configuration parameter data ("conf param") 122. Further, configuration manager 134 can be configured to store configuration parameter data 122, and responsive to such data, call control manager 130 can be implemented by a user to control inbound calls before, during, or after reaching Mobile Device 102. Further, configuration manager 134 can be configured to store in database 136 audio files recorded via user interface 101 on device 102 and transmitted to call control manager 130 via narrowband 111 and/or broadband 110 call control channels.

Example Call Manager

Figure 2:
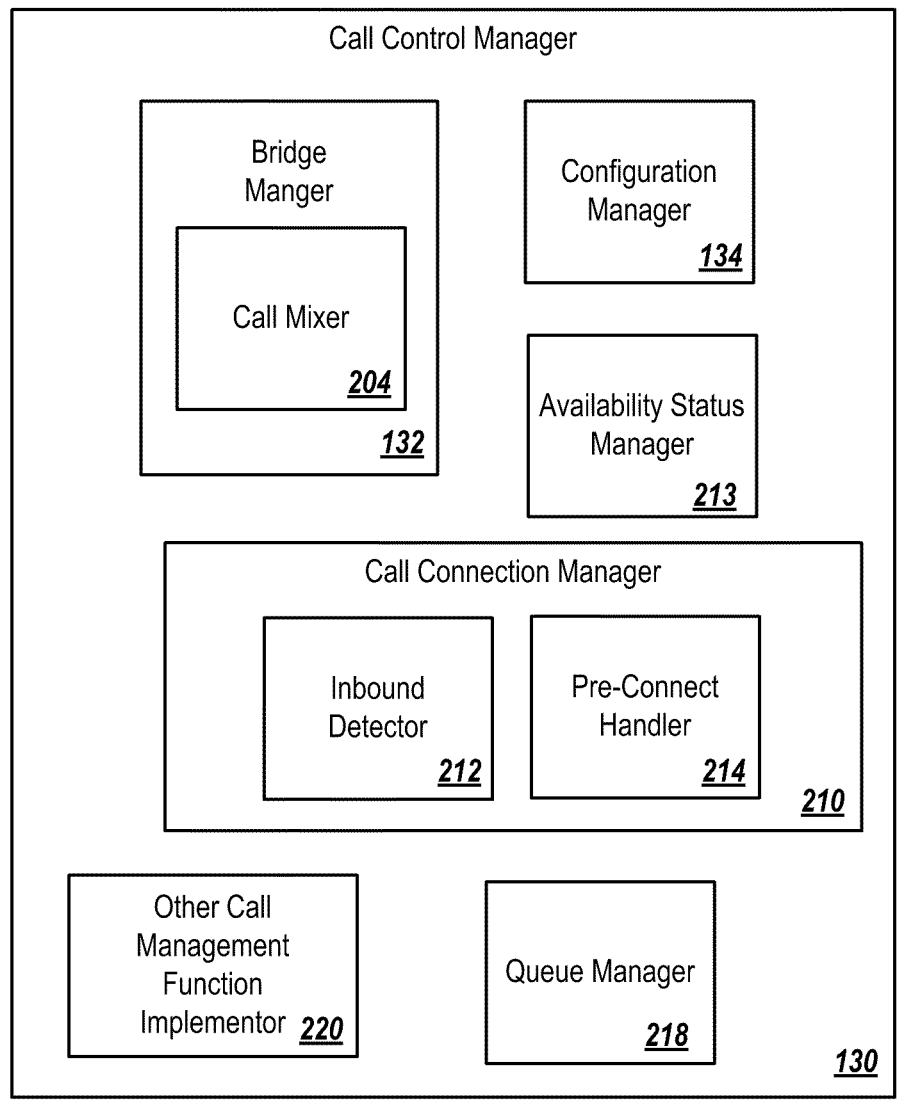
FIG. 2 is a block diagram of an example call control manager.

FIG. 2 is a block diagram of an example call control manager 130. Call control manager 130 can include a bridge manager 132, a configuration manager 134, a call connection manager 210, an available status manager 213, a queue manager 218, and a call management function 220 configured to implement any other call control function described herein. Bridge manager 132 can include a call mixer 204. In some implementations, call mixer 204 can be configured to combine calls using various telecommunication technologies and protocols. Thus, call mixer 204 can use different CODECs to implement the various telecommunication technologies and protocols. In some implementations, mixer 204 can reside in the mobile device, which can be a Mobile Device 102. Call connection manager 210 can include an inbound detector 212 and a pre-connection handler 214. Inbound detector 212 can detect a call from any communications device (e.g., communications devices 142 or 152 or 162 of FIG. 1) and can determine whether a communication link via network 106 of FIG. 1 to Mobile Device 102 can be established. For example, inbound detector 212 can communicate with Mobile Device 102 to determine whether a data rate of more than, for example, 8 kb/sec is obtainable. If not, inbound detector 212 can provide a course of action (e.g., sending the call to voicemail) until the data rate is above some acceptable threshold. Pre-connect handler 214 can interact with Mobile Device 102 to receive an instruction from call control data 112 to handle a call from either communications device 142 or communications device 152 of FIG. 1 before a connection is made. Pre-connect handler 214 can also interact with Mobile Device 102 to receive an instruction from call control data 113 to handle a call form any of communications devices 142, 152, and 162 of FIG. 1. For example, call control data 113 can be incorporated into an SMS message (or any other type of messaging protocol) capable of transport via network 104. Mobile Device 102 can generate call control data 113 that includes an instruction that causes call control manager 130 to generate a message to any of communications devices 142, 152 and 162 of FIG. 1. An example of such a message is "I am out of wireless LAN range. I will call you later when I can make a VOIP call." Any of the components of call control manager 130 can be implemented in hardware or software, or a combination thereof.

Example Mobile Device Implementation

Figure 3:
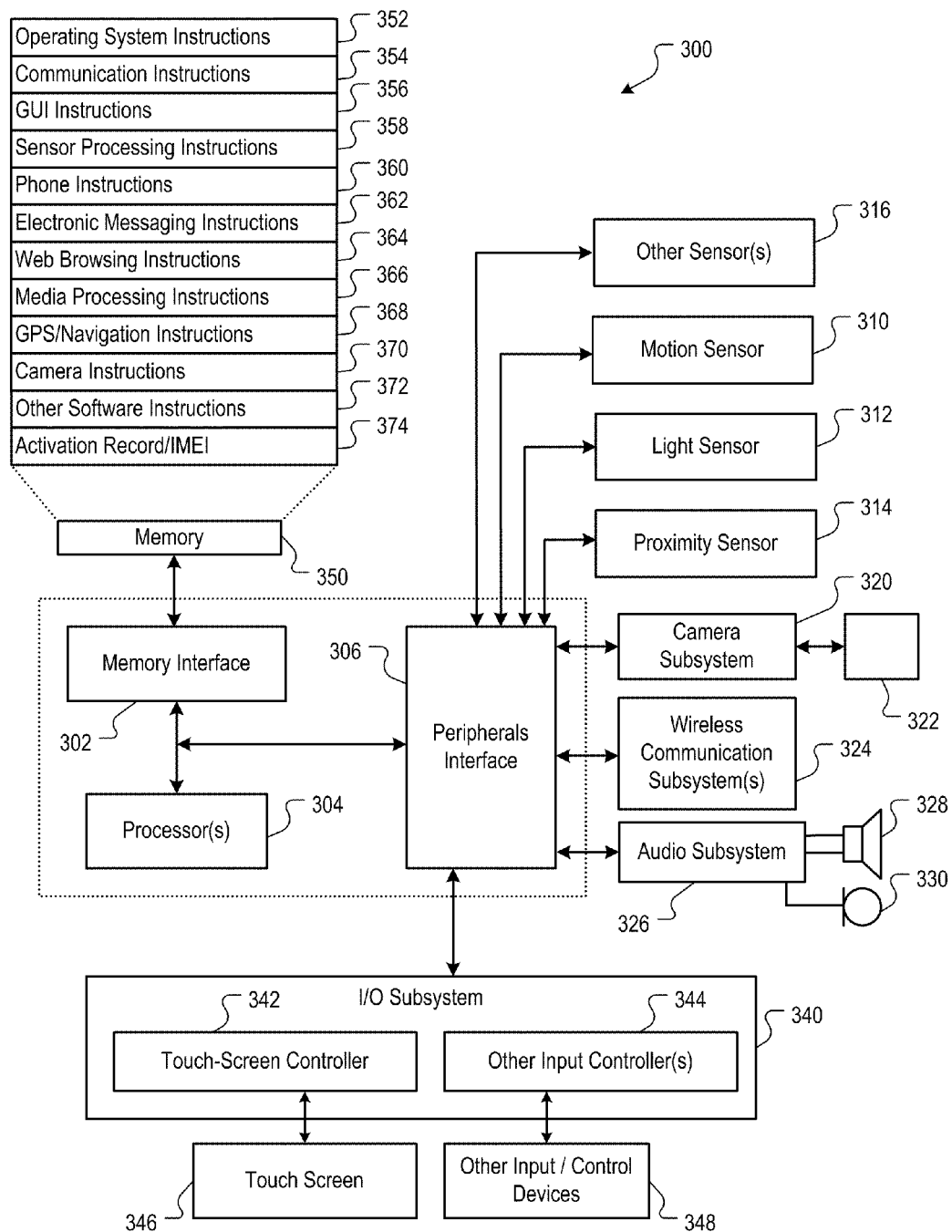
FIG. 3 shows example system architecture of a mobile device.

FIG. 3 is a block diagram 300 of an example implementation of a mobile device (e.g., Mobile Device 100). The mobile device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 can include hosting protocols such that the mobile device can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration can disengage a lock of the touch screen 346; and a pressing of the button for a second duration that is longer than the first duration can turn power to the mobile device on or off. The user can be able to customize a functionality of one or more of the buttons. The touch screen 346 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel).

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions as described in reference to FIGS. 5 and 6. The memory 350 can also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity ("IMEI") 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device can be implemented in hardware and/or in software, including in one or more signal processing and/or application specific integrated circuits.

Call Queuing Overview

Figure 4A:
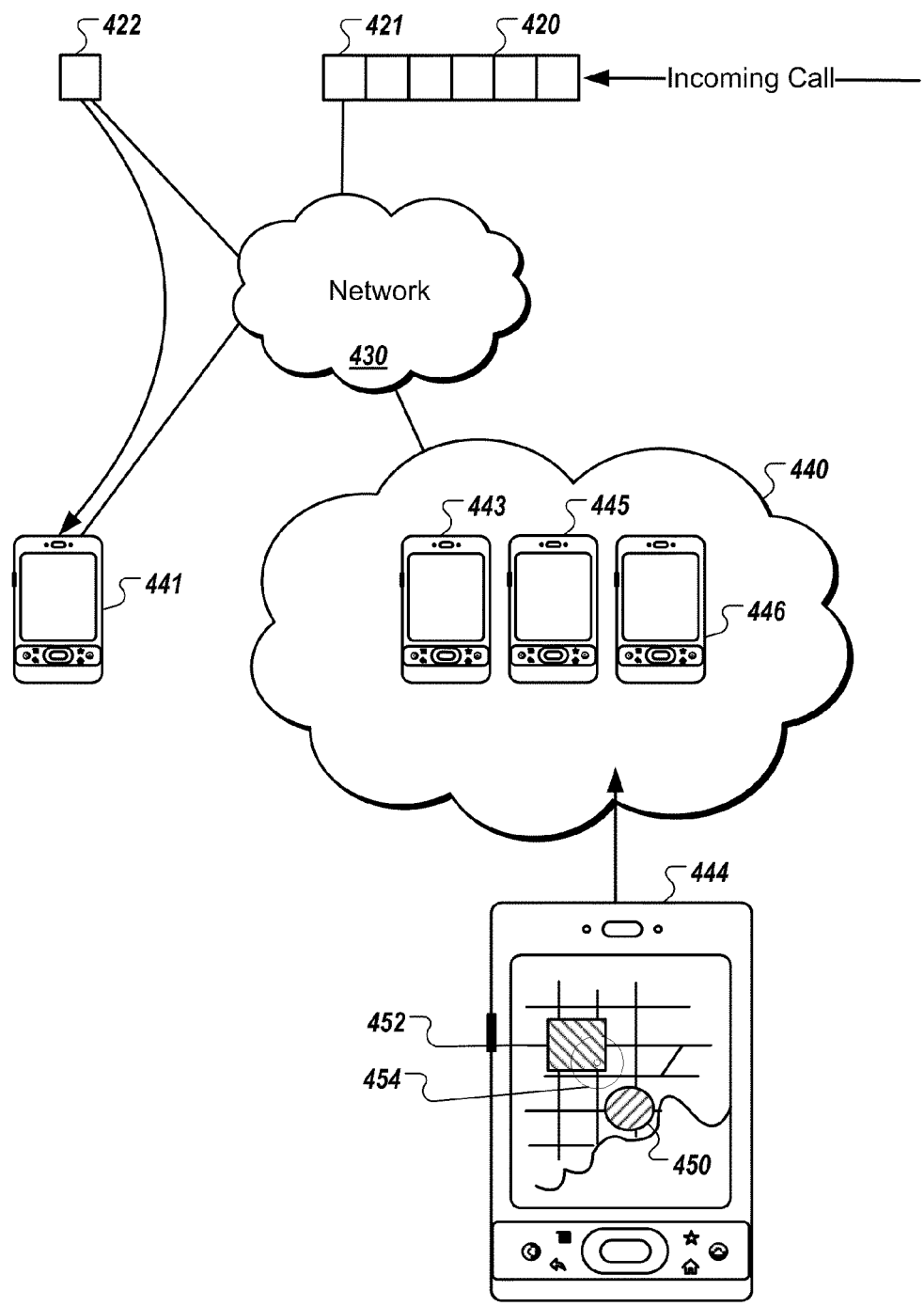
FIG. 4A shows an overview of a call queuing system.

FIG. 4A is an overview of a call queuing system. Incoming calls to a vPBX system are entered into a queue 420. Each square in queue 420 can represent a call. The queue can be managed by a queue manager 218, which will be described in more details below. The queue 420 has a head 421. A head of a queue is a call that has been in the queue for the longest time. Calls can be answered in the order the calls enter the queue 420. If a call is answered, the answered call is removed from the queue. For example, call 422 is being answered, and is removed from the queue 420.

Mobile devices 441, 443, 444, 445, 446 can be configured as queue agents who can answer the incoming calls in the queue 420. The configuration can be stored on the vPBX server. The mobile devices can form a virtual call center, where each mobile device can connect to a call through a network 430. All the available mobile devices 443, 445, and 446 that are queue agents can be in an available agent pool 440. The devices 443, 445, and 446 can take turns answering the calls based on a polling mechanism. If a device answers a call, the device is temporarily taken out of the available agent pool 440. For example, device 441 took a turn and answered call 422, and is temporarily out of the pool. Call agent 441 can (re-)enter the availability pool 440 when the agent finishes answering the call. Other call agents can enter the availability pool 440 upon a variety of conditions, such as, without limitation, when a mobile device that is an agent is being turned on. In some implementations, the call agent 441 can re-enter the availability pool 440 after a wrap-up time interval. The wrap up time interval can designate a period during which the call agent 441 is unavailable after taking and completing a call. Once the wrap-up time interval is expired, the status of the call agent 441 can be reset to available again. As an example, the wrap-up time interval can be set to 15 minutes. The call agent 441 can be assigned to take a call (e.g., a call in the call queue 420 with the highest priority). After taking the call, the status of the call agent 441 can be set to unavailable. After the call is completed, the status of the call agent 441 can remain unavailable for 15 minutes, after which the status of the call agent 441 can be changed to available so that the call agent 441 can receive another call in the call queue 420.

In some implementations, the mobile device 444 can become available and enter the available agent pool 440 when the mobile device 444 enters a particular geographic location. Mobile device 444 can display a map, which can contain streets, addresses, and current location of the mobile device 444. Some areas on the map can be highlighted. The highlighted areas can designate locations where mobile device 444 becomes available as a call agent. For example, highlighted area 450 can designate an address that represents a user's office. Highlighted area 452 can designate an address that represents a user's factory. In the availability status manager 213 (see FIG. 2), a database can contain rules that state that if mobile device 444 is in area 450 or 452, mobile device 444 is available to answer calls as a queue agent.

Mobile device 444 can be integrated with or coupled to a positioning system such as the GPS. The positioning system can determine the device's current location. The current location can be displayed as a circle 454, which has a center. The center of circle 454 can represent the current location of the mobile device, and the radius of the circle 454 can indicate the precision with which the device's location is determined. Mobile device 444 can transmit its current geographic location in latitude, longitude, and altitude coordinates to a vPBX server. In this example, mobile device 444 is currently located within the highlighted area 452, based on the determination of the positioning system. In some implementations, the rules stored in the availability status manager 213 control when the mobile device 444 becomes an available agent and enters the availability pool 440.

Example Call Queuing Process

Figure 4B:
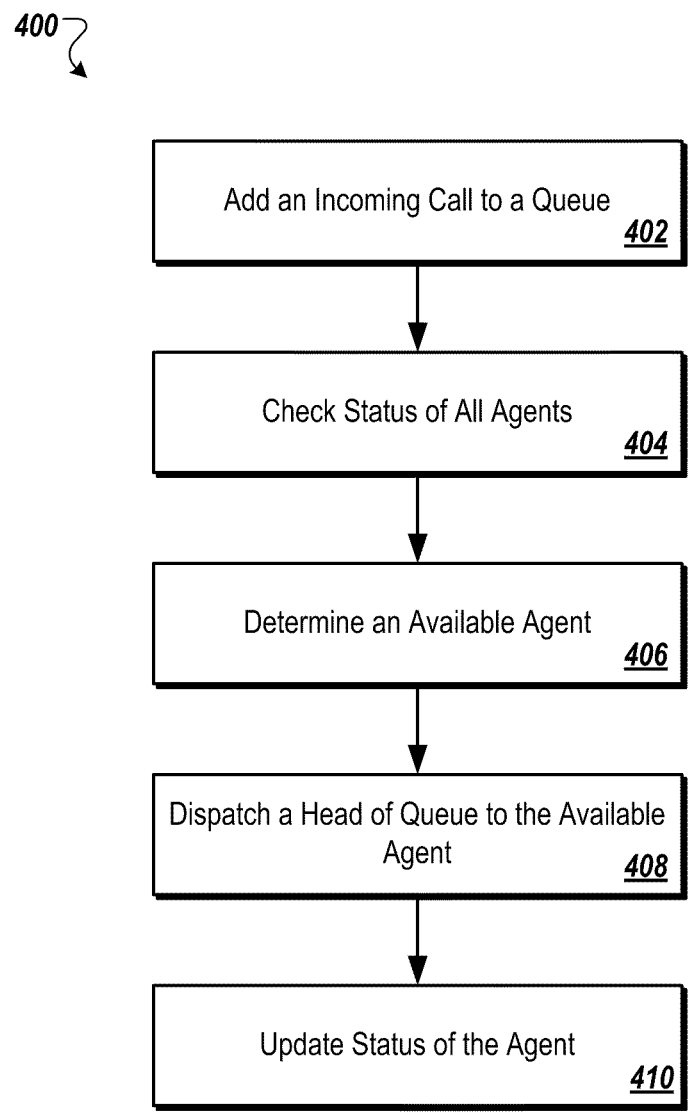
FIG. 4B is a flowchart illustrating an example process for call queuing for location-aware mobile devices.

FIG. 4B is a flowchart illustrating an example process for call queuing for location-aware mobile devices. In stage 402, an incoming call is added to a queue. A queue can be a First-In, First-Out ("FIFO") data structure into which an entity enters from the rear and from which an entity leaves from the front. In a call-queuing enabled vPBX system, a call queue is maintained on one or more vPBX servers. A call control manager 130 can contain a queue manager 218. The queue manager can be responsible of monitoring status of a call queue and status of calls in the call queue. For example, the queue manager can play background music to callers when callers are waiting for their call to be answered. The queue manager 218 can also periodically provide updates on expected wait time to the callers.

At stage 404, a status of all queue agents is checked (e.g., by a queue manager 218). A list of queue agents can be maintained on a call control manager 130. The list of queue agents can be stored in a database which can contain one or more agent tables. The list of queue agents can also contain location-based availability status of the agents. The list of agents can be maintained by an administrator. A user can be identified as an administrator by a username/password combination. In addition, a user can be identified as an administrator based on time and location. For example, a user can become an administrator of a vPBX system by logging in with a username/password combination using a mobile device with a specific serial number, at a specific location, at a specific time. Location based administrative privilege permits the vPBX system to give administrative permissions, for example, to users in the office, during normal office business hours. Location-based administrative privileges can be implemented for location-aware mobile devices, such as mobile devices that have built-in positioning systems (e.g., GPS systems) or are connected to a positioning system. The vPBX system can detect the location of a location-aware mobile device by implementing an availability status manager 213, and using the availability status manager 213 to detect the location of the mobile device by, for example, polling, receiving periodic location updates, or receiving updates triggered by movement of the mobile device.

In stage 406, the availability status of agents is determined (e.g., by the queue manager 218). Availability status of agents can include whether a device connected to an extension designated as a queue agent is turned on. Availability status can also include whether a person responsible for answering calls at a an extension has logged on to the vPBX system. Availability status can also be determined by location-based rules stored on a vPBX server.

In stage 408, a head of call queue is dispatched to an available queue agent by applying a variety of dispatching rules (e.g., by the vPBX server). In some implementations, the vPBX server can dispatch the call to all available queue agents, where the first queue agent whose line is picked up takes the call. In some implementations, the vPBX server can dispatch the call to a queue agent selected from available queue agents. The selection can be based on rules stored on the vPBX server, such as round robin (where the vPBX server dispatches calls to queue agents in turn), least recent (where the least recently called queue agent is selected), fewest called (a queue agent that has the least number of calls or least amount of call time is selected), or random selection. The selection can alternatively or additionally be based on the location of the queue agent.

For example, a selection can be based on a nearest location. In a nearest location selection rule, a location of an incoming call can be determined by, for example, the area code of the call, or by a caller-entered zip code. The location of a queue agent can be determined by the current geographic coordinates of a location-aware mobile device that is designated as the queue agent. Nearest location selection can be beneficial because under some circumstances, a customer service representative who is geographically close to a customer can provide better local information to the customer than a remote representative can.

For another example, the selection can be based on movement speed. A location-aware mobile device can track the speed of movement of the device. A vPBX server can infer a customer service representative is "on the move," e.g., driving, if the speed of a mobile device used by the representative reaches a certain threshold or is within a certain speed range, such as moving above five mph. Movement based selection can be beneficial because the vPBX server can assign lower priority to a representative currently driving.

In stage 410, the status of a queue agent is updated (e.g., to whom the vPBX server dispatched the head of the call queue). The update can include changing the availability status of the queue agent to offline, registering a current time, registering a call location based on the geographic location of a location-aware mobile device, and increasing a call counter for the queue agent. The call time and call counter can be utilized as a selection process for assigning a next call in the queue to a next available agent. The vPBX server can also update the status of the queue agent when the queue agent has completed the call. Further, the vPBX server can update the status of the queue agent when the queue agent moves into or out of a pre-determined area. For example, a location-aware mobile device can be programmed to send an update request to the vPBX server when the mobile device moves into office or out of office. The location "office" can be pre-defined in the vPBX server by a set of geographic coordinates and a proximity parameter such as a radius.

Example Architecture of Availability Status Manager

Figure 5A:
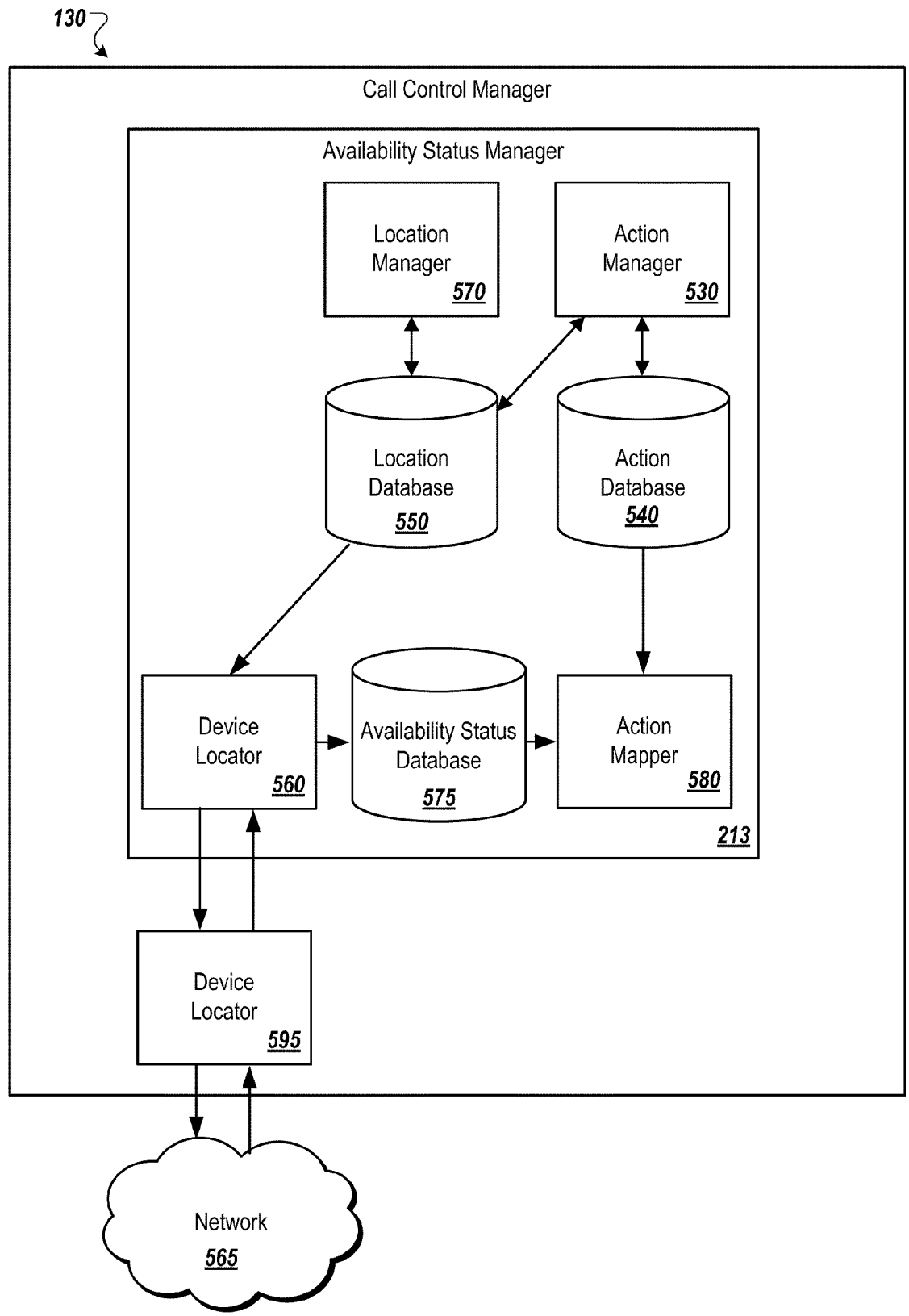
FIG. 5A is a block diagram of an example architecture of an availability status manager.

FIG. 5A is a block diagram of an example architecture of an availability status manager. A call control manager 130 in the vPBX system contains an availability status manager 213. The availability status manager 213 interacts with other components of the call control manager 130, e.g. the bridge manager 132, the configuration manager 134, and the call connection manager 210 to manage voice and data communications in the vPBX network.

Availability status manager 213 can contain action manager 530 and action database 540. Action database 540 is a repository of action rules. An action rule determines what action the call control manager 130 performs when a mobile device at a specified location receives a call. For example, an action rule can state "if a mobile device is in office, reroute the call to a land line phone number in that office." Action manager 530 is responsible for adding, editing, and deleting the action rules in the rule database 540. Action manager 530 can interact with other components of call control manager 130 to provide user interface to facilitate the adding, editing, and deleting of the rules in the rule database 540.

In some implementations, availability status manager 213 also contains a location database 550 and location manager 570. The location database 550 is a repository of location rules associating location labels with geographic locations. For example, the location database 550 can contain a mapping rule that if a mobile device is located within five meters from latitude x, longitude y, and altitude z, then the location status of the device is "office." The term "five meters" is a proximity radius. A proximity radius is helpful because a proximity radius can facilitate successful mapping when the device is in the proximity of a predetermined location rather than requiring an exact location match. For another example, the location database 550 can contain another mapping rule that if a mobile device is located within a space defined by vertices A, B, C, D, E, F, G, and H, the location status of the device is "home." The geographic coordinates of vertices A through H are also stored in the location database 550. The location manager 570 can contain software tools for modifying the location rule database.

Availability status manager 213 also contains an availability database 575. Availability database 575 stores the most current availability status of mobile devices within the vPBX network. Availability status of a mobile devices describes the status of the device, e.g. "home," "out of town," or "office."

Availability status manager 213 also contains a device locator 560. Device locator 560 is responsible for receiving the geo-location information from the mobile devices within the vPBX network. Device locator 560 works with other components in the call control manager 130 to get device geo-location information from a communication network 565. In various implementations, the polling module 560 can actively poll the mobile devices within the vPBX network or passively receive the geographic information from the mobile devices. After receiving current geographic coordinates from a mobile device, the device locator 560 matches the geographic coordinates with the location rules in the location database 550. The match can be an exact match, a proximate match when the current geographic coordinates are within the proximate radius of a location, or a space match if the current geographic coordinates are within a space defined by a set of vertices. If the device locator 560 finds such a match, the device locator 560 updates the availability status database 575.

When the call control manager 130 detects a call to a mobile device connected to the vPBX network, the call control manager 130 checks the device status by querying the availability status database 575. The call can be originated from outside the vPBX network or originated within the vPBX network. The call can be to a mobile device. An action mapper 580 queries both the availability status database 575 and action database 540 to determine what action to take on the call to the mobile device. For example, if the status of a device is "office" in the availability status database 575, and an action rule states "if a mobile device is in office, route calls to that mobile device to a landline phone number in that office," then the action mapper 580 instructs call control manager 130 to reroute the call to the landline phone number in that office.

Example Queue Manager

Figure 5B:
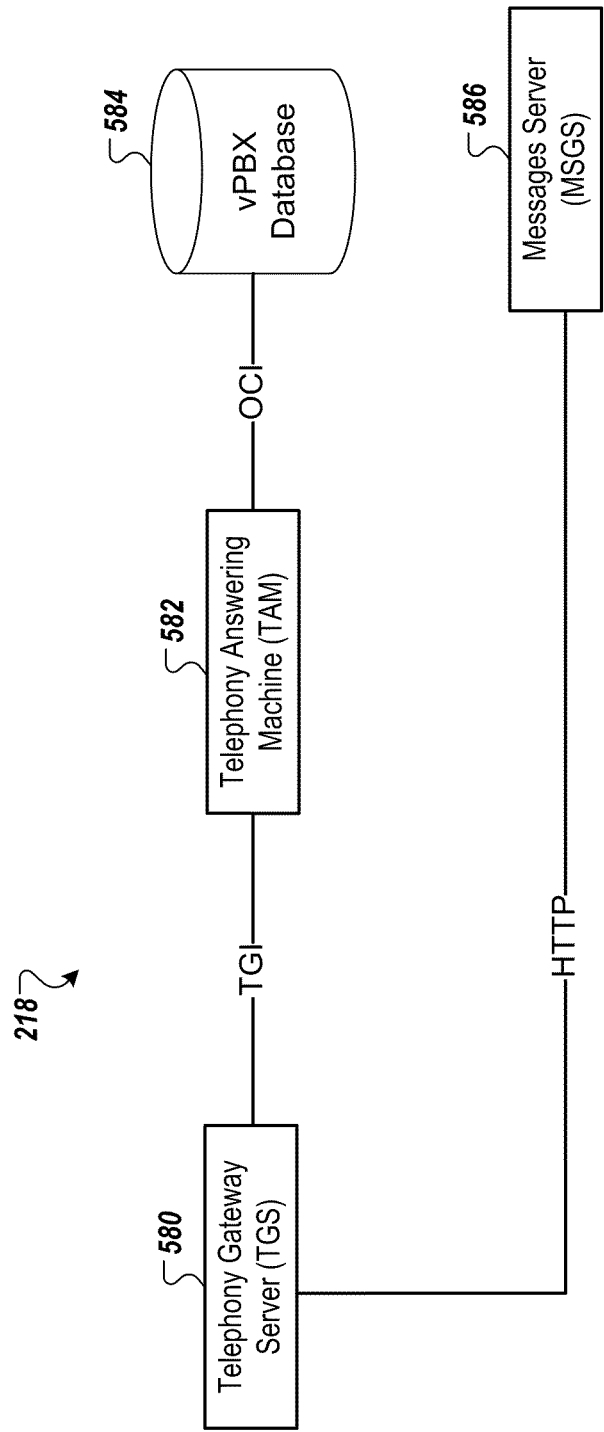
FIG. 5B is a block diagram of a queue manager.

FIG. 5B is a diagram showing an example structure of a queue manager 218. A queue manager 218 can manage calling queues. A vPBX database 584 supports the queue manager 218. The vPBX database 584 can store queue manager configuration, references to answering messages, references to music being played to a caller when the caller's call is waiting in queue, references to caller left messages, and other queue related information. The vPBX database 584 can be implemented in a relational database management system ("RDBMS"), an object-oriented database system, or a plain file system. The vPBX database 584 is typically hosted by a database server, but can be hosted by a mobile device which has sufficient processing power and input/output through put, such as a mobile device on a 3G network.

A telephony answering machine 582 ("TAM") handles call queues. The TAM 582 can be a program that runs on one or more computers. When running on a Windows based computer, the TAM 582 can be implemented as a Windows service. When running on a UNIX based computer, the TAM 582 can run as a cron job. The TAM 582 can represent business logic, and determine, for example, how to poll the available agents. The TAM 582 can provide estimate wait time, permit a caller to leave a message instead of continue waiting, permit a caller to identify a specific call agent to connect to, etc. The TAM 582 can be linked to the vPBX database 584 using various database interfaces. For example, if vPBX database 584 is implemented using an Oracle database, such as Oracle 10g, the link between TAM 582 and vPBX database 584 can be based on Oracle Call Interface ("OCI").

A Telephony Gateway Server 580 ("TGS") executes requests from TAM 582. The TGS 580 can make outbound calls, download or upload files to and from a messages server 586 ("MSGS"), play messages to a caller when the caller's call has to wait in a queue, and play background music and wait-time update while a call is in a queue. The TGS 580 is connected to a switched network (e.g., a telephone network), and therefore is a "gateway" between a packet network and the switched network. The TGS 580 communicates with the TAM 582 using a telephony gateway interface ("TGI"), which can be a protocol of communication between TGS 580 and TAM 582.

The MSGS 586 can store messages. Messages can be voice messages or data messages (such as a fax document). For example, MSGS 580 can physically store greeting messages, background music, wait-time update messages, and messages left by a caller if a caller chooses to leave a voice message instead of waiting in a queue. The references to the messages stored on MSGS 580 can be stored in the vPBX database 584. The TGS 580 can communicate with the MSGS 580 via a variety of protocols, such as HTTP.

Example Process for Designating a Queue Agent

Figure 6:
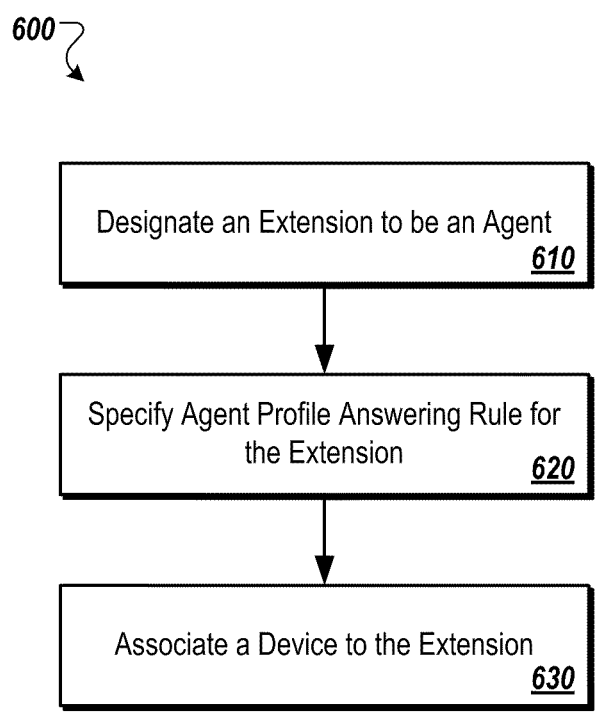
FIG. 6 is a flowchart illustrating an example process for designating an extension as a queue agent.

FIG. 6 is a flowchart illustrating an example process for designating an extension as queue agent.

In stage 610, a user can designate an extension to be a queue agent. In one implementation, the user is required to be an administrator. In another implementation, the user is not required to have administrative privilege. The designation can be implemented by a registration process. The registration process can be, for example, HTTP registration. A vPBX server maintains records of extensions in a vPBX network. The records can include a service type variable that indicates settings of the extensions. An extension can be designated as a queue agent, for example, by giving a value to a bit in the service type variable. The value can be 1 (the extension is a queue agent) or 0 (the extension is not a queue agent). The value of the bit can be set or retrieved by applying a service mask to the service type variable. An example service mask for queue agent can be 0x800000000.

In stage 620, an agent profile answer rule for a queue agent can be specified. The agent profile answer rule can contain information indicating, for example, the skill level of a person responsible for the extension, the hours during which a call can be answered by the extension, and queue agent selection method (e.g., round robin, etc.).

In stage 630, a user can associate one or more devices to an extension designated as a queue agent. In the vPBX system, it is not necessary that an extension is associated with a single device. Multiple devices can be configured to have the same extension. By default, a device already associated with an extension designated as a queue agent is the device that answers calls from the queue. However, a user may add another device, such as a mobile device, to the same extension.

On a vPBX system user interface, queue agents extensions can be displayed visually differently from non-queue agents.

The vPBX server can be configured such that a user of a device associated with a queue agent extension is required to log in before a call from the queue can be routed to the device. A log in process can require a username/password combination. In addition, a log in process can be based on time and location. For example, a user can log in by using a mobile device with a specific serial number, at a specific location, at a specific time, in addition or as an alternative to providing username and password.

A change in an extension configuration can result in the vPBX server sending requests to all devices currently connected to the vPBX server. The request can be that users re-login to the vPBX system. The change that can trigger the vPBX to send such a request can be removing a queue agent extension, together with the defined agent profile answering rules associated with the extension, from queue agent list. The removal can be achieved by un-checking an "agent" check box on a Web page. The removal can also be achieved by tapping a "remove agent" button on a touch-screen of a mobile device.

A re-login request can also be triggered by adding a regular extension for which agent profile answering rule has been previously defined. A re-login request can further be triggered by adding an agent profile answering rule to a queue agent that does not have a previously defined agent profile answering rule before.

Example User Interface for Defining Availability Status

Figure 7:
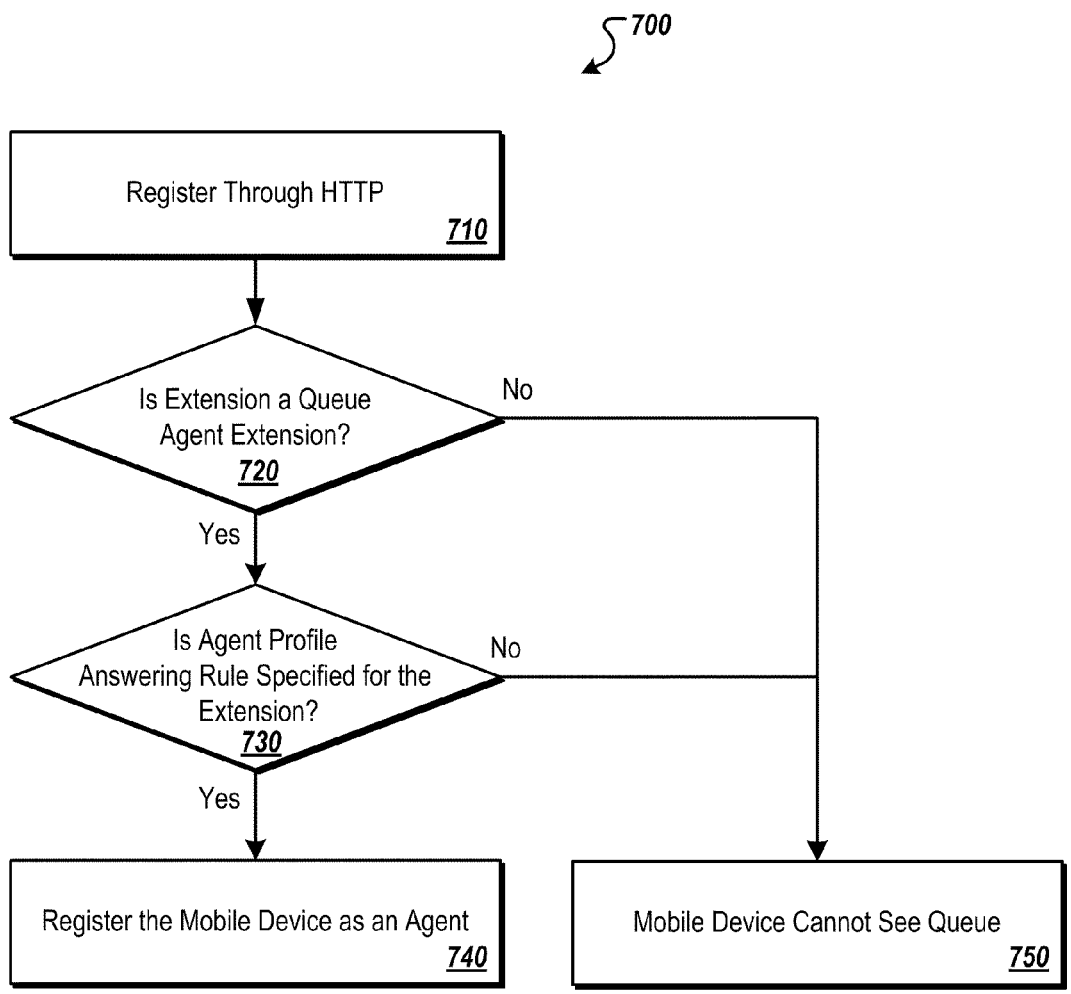
FIG. 7 is a flowchart illustrating an example process for associating a mobile device with a queue agent extension.

FIG. 7 is a flowchart illustrating an example process for associating a mobile device with a queue agent extension. In stage 710 a mobile device is registered (e.g., through an HTTP connection). In some implementations, a mobile device can access a registration page hosted on a vPBX server through HTTP protocol. The registration can be performed through a Web browser installed on the mobile device being registered, or through an interface customized for a touch-screen display device on the mobile device.

In stage 720, a determination is made whether the mobile device is connected to a queue agent extension. In some implementations, the mobile device can make the determination by checking a service type variable stored in the vPBX server for the extension. For example, the checking can be made by applying a service mask 0x8000000 to the service type variable.

If an extension is a queue agent extension, in stage 730 a determination is made whether an agent profile answering rule is specified for the extension to which the mobile device is connected. If an agent profile answering rule is already specified for the extension, adding the mobile device to the extension can allow the queue manager 218 to dispatch calls in the call queue to the mobile device.

If an agent profile answering rule is already specified, in stage 740 the mobile device can be registered. The registering can be made by setting a bit in a device type variable by applying a device type mask. The device type variable can be stored in a device database on the vPBX server.

If an extension is not a queue agent extension, or if no agent profile answering rule is specified for the extension, the registration can end at stage 750, where no service type variable bit is changed. As a result, a mobile device connected to the extension cannot access the call queue.

Example Queue Agent and Device Rules

FIGS. 8A-8B show examples of agent profile answering rules and mobile device availability rules. FIG. 8A shows an example database table 800 that contains a set of agent profile answering rules for queue agents. Extension column 810 stores extension numbers for extensions that are designated as queue agents. In this example, two extension numbers "1000" and "1001" are designated as queue agents. In device column 820, fixed and mobile devices are assigned to queue agent extensions. In the vPBX system, an extension can be associated with more than one device. In this example, extension 1000 is associated with three devices: a landline phone 650 555 1234, a mobile device Mobile Device 1, and a voicemail server. Extension 1001 is associated with one mobile device, Mobile Device 2. Agent profile answering rules can specify, for example, time periods in which an extension is available to answer calls in the queue. The time periods can have a granularity that can determine which one of a plurality of devices can answer a call at a certain time. In this example, available time column 830 specifies time based rules. For extension 1000, landline phone 650 555 1234 can answer calls between 9 am and 5 pm; Mobile Device 1 can answer calls between 5 pm and 10 pm; and between 10 pm and 9 am, calls routed to extension 1000 will be forwarded to voice mail. For extension 1001, all calls are routed to Mobile Device 2.

In example database table 800, available time column 830 is shown to include time-of-day rules. Available time 830 can also have week-of-day rules and holiday rules that can be applied in conjunction with the time-of-day rules. Criteria other than time can also be part of agent profile answering rules. For example, a person's level of skill can be a criterion in determining when an extension or a device can answer a call. The person's level of skill can be stored in a table in a user profile database. A queue manager can determine the person's level of skill by querying the user profile database when the person logs in to the vPBX system.

In FIG. 8B, an example database table 850 stores location based availability rules for a mobile device. In device column 860, Mobile Device 2 is specified. Status column 870 specifies locations where action rules apply. Action column specifies what action the vPBX server performs when a mobile device is at a specific location. For example, if Mobile Device 2 is at "home," the vPBX server can forward calls destined for Mobile Device 2 to landline phone number 650 555 4321. If Mobile Device 2 is in "office," the vPBX server can forward calls destined for Mobile Device 2 to landline phone number 650 555 1234. If Mobile Device 2 is neither at home nor in office, the vPBX server does not perform call forwarding and dispatches calls in a call queue to Mobile Device 2.

Agent profile answering rules in FIG. 8A and location based availability rules in FIG. 8B can work in conjunction. For example, landline phone number 650 555 1234 is a device under queue agent extension 1000, according to agent profile answering rules in FIG. 8A. Landline phone number 650 555 1234 can also be a forwarding device for queue agent for extension 1001, when Mobile Device 2 is in office, under location based availability rules in FIG. 8B. As a result, when Mobile Device 2 is in office, landline phone number 650 555 1234 answers both calls in a call queue routed to extension 1000 and calls in the call queue routed to extension 1001.

Example Process for Creating and Managing a Call Queue

Figure 9:
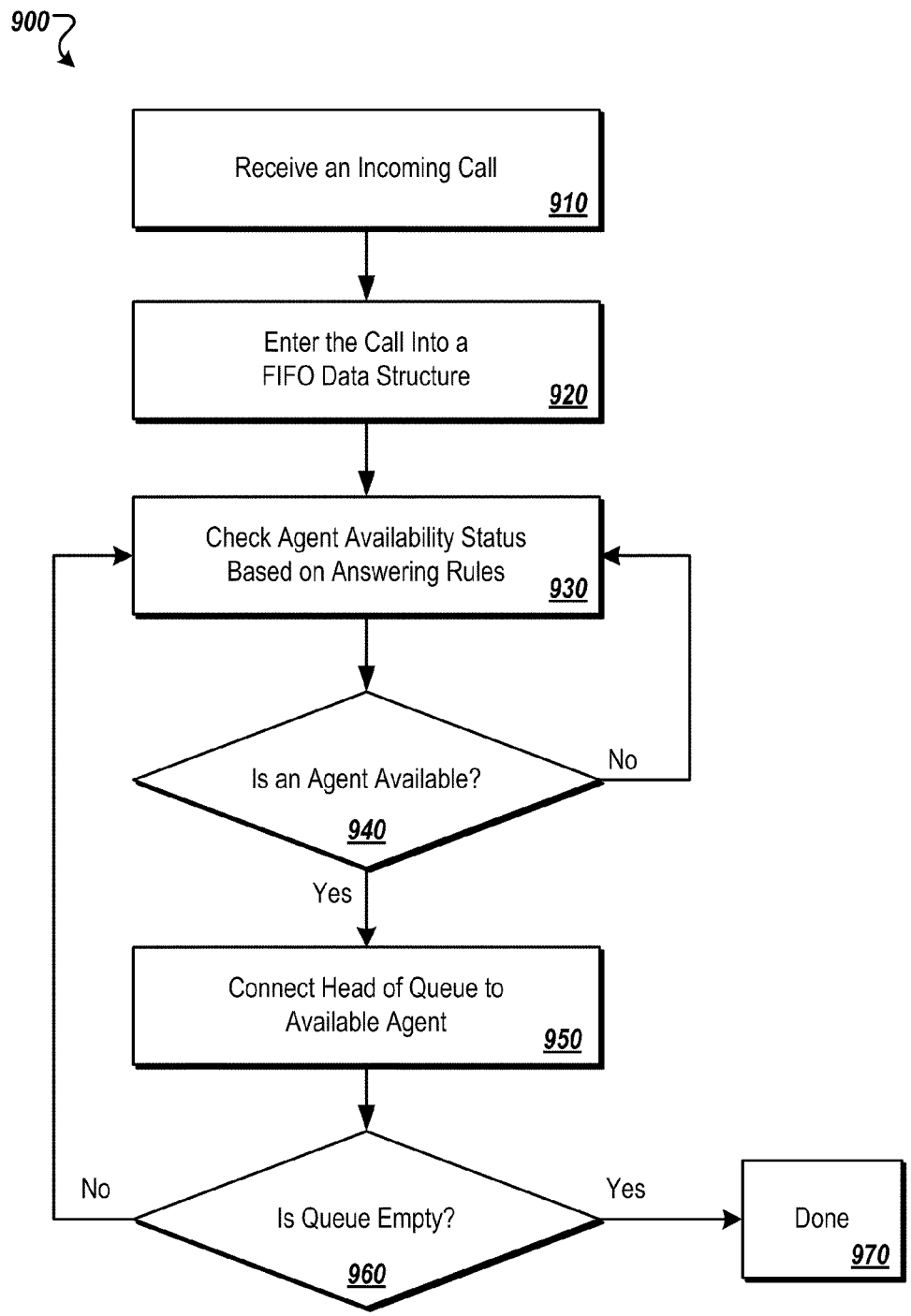
FIG. 9 is a flow chart illustrating an example process for creating and managing a call queue.

FIG. 9 is a flowchart illustrating an example process for creating and managing a call queue. In stage 910, a call is received. In stage 920, the call is entered into a call queue which can be of the form of a FIFO data structure. In stage 930, a a queue agent availability status is checked. In one example implementation, availability status can be defined as an enumerated type, availability enum, with at least three possible values, as illustrated in Table 1.

TABLE 1

Availability Status

| Value | Meaning |
|---|---|
| 0 | N/A. The extension is not a queue agent. |
| 1 | Offline. Queue agent is offline. |
| 2 | Online. Queue agent is online. |

The vPBX server can pass an initial queue agent availability status to a device associated with the queue agent extension through HTTP registration. The passing of values can be implemented through an object-oriented language such as Objective C or Java. An example class IXPRegistrator can be used to implement the availability status related activities. An example method IXPRegistrator::Register can be used for registering a device, including a mobile device, and querying mailbox parameters to provide availability status information. Querying current availability status can return a value defined by an availability enum.

In stage 940, a determination is made whether a queue agent is available based on a query return value that is an availability enum. If no queue agent is currently available, the process continues at stage 930. If one or more queue agents are currently available, a determination is made of which queue agent to select based on queue agent selection rules. The head of the call queue can be connected to a device associated with the selected queue agent in stage 950. The connection can be subject to one or more location-based rules for a mobile device. The location based rules can re-direct the call to another mobile device or fixed device.

The status of a connected queue agent can be updated in stage 950. In some implementations, the vPBX server can update an agent status database on the vPBX server. In some implementations, the vPBX server can send a status update message to devices connected to queue agent extensions. The status update message can be useful, for example, for allowing other queue agents to display that one particular queue agent has become unavailable. Table 2 illustrates an example structure of a status update message.

TABLE 2

Status Update Message
Data Class class CNtfData__AVL__CHANGE: public CRegisteredNotificationData
{
   public:
      CString m__strClient;
      int m__nQueueAvailablity;
};

In Table 2, m_strClient member is an instance id of a device on which the status is being changed. nQueueAvailablity member is a new queue agent availability status. Value of nQueueAvailablity is one of the values described by the availability enum. Values passed in nQueueAvailablity field of a status update message that are not valid under the availability enum can be ignored. Devices that are not associated with a queue agent extension ignore status update messages. Devices that are associated with a queue agent extension can display received status update on a user interface, e.g., a display screen of a mobile device.

In stage 960, the head of a call queue is removed and a check is made to determine if the call queue is empty. If the call queue is not empty, the next call in the call queue is designated as a new head, and a check is made if there is another queue agent available by repeating stage 930. If the call queue is empty, the process can wait for a next call to arrive.

Example Process for Managing Location-Aware Mobile Devices for a Queue Agent

Figure 10:
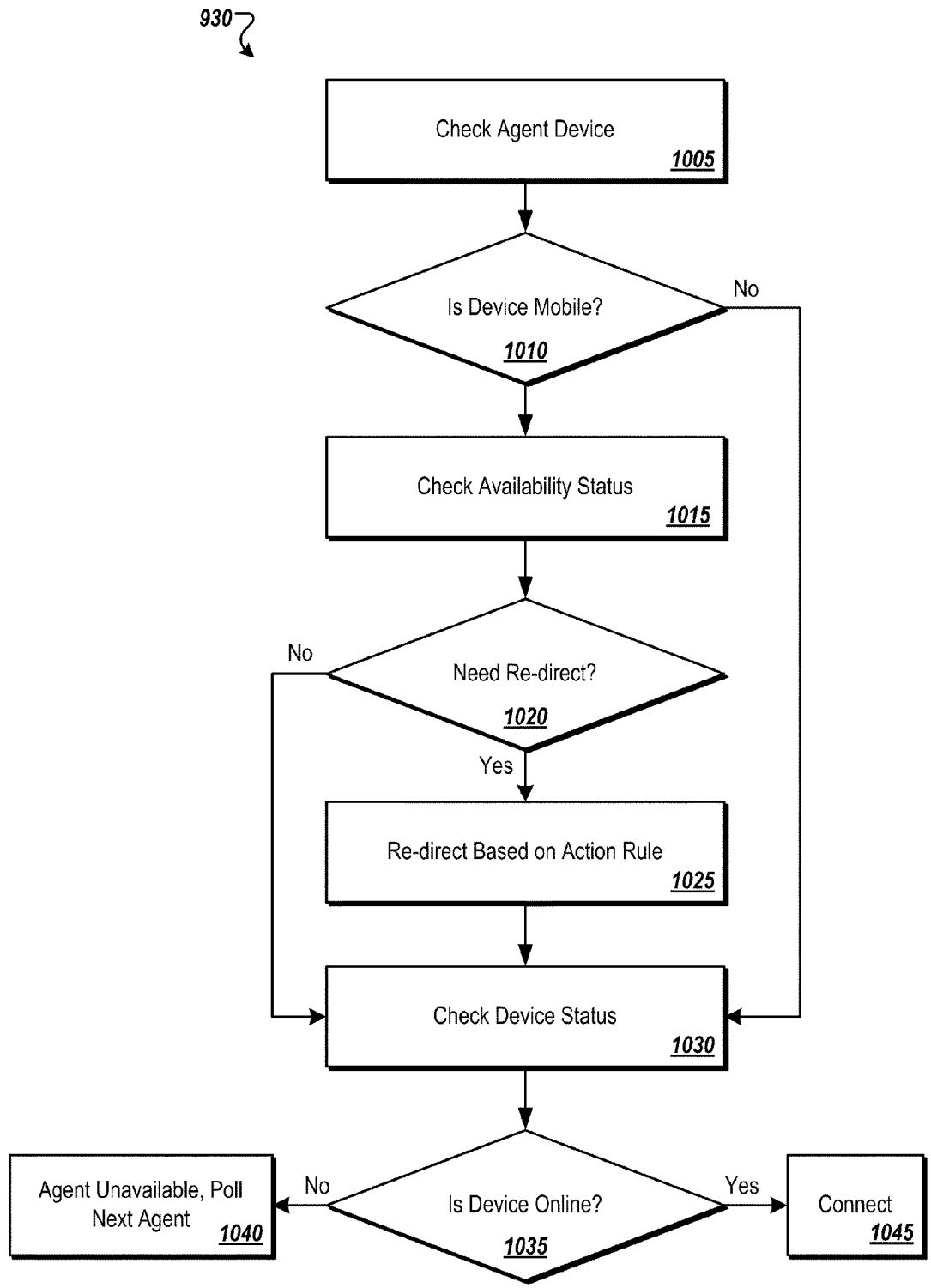
FIG. 10 is a flow chart illustrating an example implementation of assigning queued calls to a location-aware mobile device.

FIG. 10 is a flowchart illustrating an example implementation for assigning queued calls to a location-aware mobile device.

In stage 1005, a request is received to handle a head of a call queue (e.g., a queue agent receives the request from a queue manager 218). Before actually ringing a device, a check is made to determine if a device associated with the queue agent is a mobile device in stage 1010. The check can be accomplished by checking a registered status for the device in database table 800 that contains a set of rules for user agents. If the device is not a mobile device, a final status check on the device can be performed in stage 1030. Stage 1030 can be necessary when multiple devices are associated with a queue agent. In the multiple device scenario, it is possible that the queue agent is available to answer a call, but not all devices associated with the queue agent extension are available. When unavailable devices are present, the queue manager can perform the device status check in stage 1030. If an available device is determined in stage 1035, the call is connected to the available device in stage 1040. If a device is unavailable in stage 1035, an attempt is made to locate a next available device. If no devices are available, the status of the queue agent is changed to offline and the call is dispatched to a next queue agent in stage 1040.

If a device associated with the queue agent is a mobile device, a check of the mobile device's location-based availability status can be made in stage 1015. Location-based availability status of a mobile device can be distinct from a call availability status of a queue agent. Location-based availability status can indicate the geographic location of a mobile device by assigning a label, e.g., "office," when the mobile device's geographical coordinates are within a predetermined proximate radius of a predetermined geographical location. In some implementations, location-based availability status can be factors in determining call availability status of queue agents.

In stage 1020, a determination can be made if the call can be redirected to another device based on the location-based availability of the mobile device and predefined actions rules for the mobile device. For example, referring to FIG. 8B, a Mobile Device 2 can have an action rule that provides forwarding to a landline phone number 650 555 1234 when Mobile Device 2 is in office. Under this action rule, the availability status manager can determine that forwarding is necessary, when Mobile Device 2 is in office.

In example flow 1000, the checking of the availability status at stage 1015 and determining whether to forward at stage 1020 are in two separate stages. In some implementations, stages 1015 and 1020 can be merged into a single stage, in which a queue manager checks an availability database 575 to determine what action to take. The single stage approach can have a benefit of reduced call latency compared to the two stage approach, because real-time location checking can be avoided if the location-based availability status is already in a database. However, there can be trade-off in that a single-stage approach can require prior updates to the availability database 575.

If redirecting is unnecessary in stage 1020, a final status check can be performed on the mobile device in stage 1035.

If redirecting is necessary in stage 1020, an attempt is made to route the call to a target device based on an action rule in a stage 1025. For example, the vPBX server can forward the call to a landline phone in stage 1025.

A further status check of a device to which a call is forwarded can be performed in stage 1030. Stage 1030 can be necessary if a queue manager determined the availability status of a queue agent based on the status of devices associated with the queue agent extension, but did not determine the availability status of a queue agent based on the devices to which calls can be forwarded according to location based forwarding rules.

In stage 1035, a determination is made whether to connect the forwarding device in stage 1045, or mark the agent as unavailable and forward the call to a next agent in stage 1040. Process 1000 can be performed, for example, by the vPBX server described above.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, while location determination has been described by way of GPS, other means for determining a location of a mobile device can be used including those that use active or passive sensors, or infer location from various information available. Accordingly, other implementations are within the scope of the following claims.

What is claimed is:

1. A method comprising:
receiving one or more calls in a call queue;
determining, by one or more computers, an availability status of a plurality of queue agents associated with the call queue, including:
  determining respective geographic locations of mobile devices associated with one or more of the queue agents;
  determining, for each of the one or more queue agents, that a respective mobile device associated with the queue agent is in a respective predetermined location for the queue agent; and
  setting the availability statuses of the one or more queue agents to indicate that the one or more queue agents are available to take calls based on the mobile devices being in the respective predetermined locations; and
selecting, by the one or more computers, an available queue agent from the one or more queue agents to answer a call in the call queue based on the availability statuses and the geographic location of the mobile devices associated with the available queue agents relative to a location of a caller from which the call originates, including:
  determining a geographic location of the caller from which the call originates;
  identifying a mobile device of a queue agent having a geographic location that is within a predetermined proximity radius of the geographic location of the caller; and
  selecting a queue agent associated with the identified mobile device as the available queue agent to answer the call.

2. The method of claim 1, further comprising:
prioritizing the one or more calls in the call queue,
where selecting the available queue agent to answer the call includes selecting an available queue agent suitable to answer a call with a highest priority.

3. The method of claim 1, where selecting the available queue agent includes:
determining a distance between each of the one or more queue agents and the caller based on the geographic location of the mobile device associated with each queue agent and the caller; and
identifying a suitable queue agent whose mobile device is at a geographic location that is closest to the geographic location of the caller as the available queue agent based on the distance.

4. The method of claim 3, where determining a distance includes determining a shortest distance between the geographic location associated with each queue agent and the caller.

5. The method of claim 1, where determining the availability status of the one or more queue agents includes determining whether the geographic location of the one or more queue agents is outside the predetermined proximity radius.

6. The method of claim 1, further comprising:
dispatching the call to the available queue agent; and
updating the availability status of the available queue agent from available to unavailable.

7. The method of claim 6, further comprising:
updating the availability status of the available queue agent from unavailable to available after a predetermined period upon completing the call.

8. The method of claim 1, where selecting the available queue agent to answer a call further includes selecting an available queue agent based on a movement speed associated with the mobile device of the queue agent.

9. The method of claim 1, further comprising:
updating the availability status of the one or more queue agents including:
  transmitting a status update message to the one or more queue agents;
  receiving a status response from the one or more queue agents; and
updating the availability status of the one or more queue agents based on the status response.

10. A method comprising:
designating a plurality of call extensions as queue agent extensions;
specifying, by one or more computers, a respective agent profile for each queue agent extension, the agent profile for each of the extensions identifying one or more mobile devices capable of answering a call to the queue agent extension and, one or more rules for determining availability statuses for the queue agent extension; and
determining a respective availability status for each of the plurality of queue agent extensions, comprising
  determining, for each of one or more of the queue agent extensions, respective geographic locations of the mobile devices identified by the agent profile for the queue agent extension;
  determining, for each of the one or more queue agent extensions, that a respective mobile device identified by the agent profile for the queue agent extension is in a respective predetermined location identified in a rule for determining the availability status of the queue agent extension; and
  setting the availability statuses of the one or more queue agent extensions to indicate that the one or more queue agent extensions are available to take calls based on the mobile devices being in the respective predetermined locations.

11. The method of claim 10, further comprising selecting a queue agent extension from the one or more queue agent extensions, and dispatching one or more calls to the selected queue agent extension, where the one or more calls are dispatched after authenticating a queue agent associated with the selected queue agent extension.

12. The method of claim 10, where specifying an agent profile for each of the queue agent extensions includes specifying one or more time periods during which the queue agent extension is available to receive one or more calls.

13. The method of claim 10, where dispatching one or more calls to the selected queue agent extension comprises dispatching the one or more calls to a first device, where the agent profile for the selected queue agent extension identifies a call-related action to be applied when the first device is in a particular geographic location, and where the call-related action includes a call forwarding action for forwarding the call when the first device is in the particular geographic location.

14. A device comprising:
a queue manager configured to:
  receive one or more calls from one or more callers;
  prioritize the one or more calls in a call queue;

identify one or more available call agents from a list of call agents where availability is determined based at least on a geographic location associated with a mobile device of each call agent, and where determining availability includes:

determining, for each of one or more of the call agents, that the mobile device of the call agent is in a respective predetermined location for the call agent; and setting the availability statuses of the one or more queue agents to indicate that the one or more call agents are available to take calls based on the mobile devices being in the respective predetermined locations; and dispatch a prioritized call in the call queue to a suitable call agent selected from the one or more identified available call agents, where suitability is based at least in part on proximity between a geographic location of a caller and the geographic location of the one or more identified available call agents.

15. The device of claim 14, where the queue manager is further configured to:

remove the prioritized call from the call queue after the prioritized call is answered by the suitable call agent; and update the list of call agents to identify the suitable call agent as unavailable.

16. The device of claim 15, where the queue manager is further configured to update the list of call agents to identify the suitable call agent as available after completing the prioritized call.

17. The device of claim 14, where proximity between the geographic location of the caller and the geographic location of the one or more identified available call agents is based on a nearest location selection rule, where the nearest location selection rule is determined using the geographic location associated with the prioritized call and the geographic location associated with the suitable call agent.

18. The device of claim 14, where selection of the suitable call agent is further based on a movement speed associated with the mobile device of the suitable call agent in comparison to other available call agents.

19. The device of claim 14, where the list of call agents includes information associated with each call agent, the information including a call time of availability and a call counter for each call agent.

20. The device of claim 19, where the queue manager is configured to identify a call agent as unavailable if the call agent has reached a predetermined call threshold based on the call counter, a call time associated with the prioritized call is outside the call time of availability of the call agent, or the geographic location of the call agent is outside a predetermined area.

21. The device of claim 14, where the queue manager includes:

a telephony answering machine to handle the one or more calls in the call queue and to generate one or more requests for dispatching the one or more calls in the call queue to one or more available queue agents; and a telephony gateway server to execute the one or more requests and to route the one or more dispatched calls to the one or more available queue agents.

22. The method of claim 10, wherein the one or more rules specify, for each of the one or more devices, one or more time periods during which device is available to receive calls.

\* \* \* \* \*